2,801,218

EMULSION GELS FOR WELL SERVICING

Paul L. Menaul, Tulsa, Okla., assignor to Pan American Petroleum Corporation, a corporation of Delaware No Drawing. Application June 18, 1954,
Serial No. 437,853

14 Claims. (Cl. 252—8.55)

This invention relates to temporarily stable gels for well servicing. More particularly it relates to gels of the emulsion type.

This invention is a continuation-in-part of my co-pending application S. N. 204,083 filed January 2, 1951, now U. S. Patent No. 2,681,704. The parent application discloses and claims gels suitable for well servicing in which an enzyme is incorporated for breaking the gels after a short time. The parent application is directed principally to non-oily aqueous gels.

I have now found that very advantageous gels of an oily nature can be prepared by employing organic jellifying colloid materials such as pectin as emulsifying agents. The emulsion is broken and the gel properties are thus destroyed by incorporating a small amount of enzyme in the aqueous phase of the emulsion to destroy the emulsifying agent.

Such a temporarily stable emulsion gel has several applications in well servicing. For example, the gel may be used in the hydraulic fracturing of formations as described in Reissue 23,733, Farris. The gel can also be used as a blanketing agent in well treating operations to seal off some zones temporarily and thus direct the treating fluids, such as aqueous acid solutions, into other zones. Other uses will be apparent to those skilled in the art.

My emulsion gels usually contain 5 constituents: oil, water, an organic jellifying colloid, an enzyme capable of decomposing the colloid, and finely divided solids. All are essential ingredients with the possible exception of the finely divided solids. The various components can now be considered separately in more detail.

The oil may be of vegetable origin. For example, it may be cottonseed oil. The oil may also be an animal oil such as whale oil. It is preferred, however, that a mineral oil such as a refined petroleum fraction, for example kerosene, should be used. Certain crude oils may also be employed under some circumstances. When the term "oil" is employed hereinafter, an oil or mixture of oils of vegetable, animal or mineral origin such as those just mentioned is intended.

The aqueous phase of the emulsion may, in some cases, contain salts such as sodium chloride. However, these salts often have had bad effects on both the jelling properties of the colloid and the ability of the enzyme to break down the colloid. Therefore, it is preferred in most cases that the water be fresh; that is, it should contain little salt.

The water phase should amount to at least about 10 percent of the emulsion volume in order to form an emulsion which will remain stable until broken by the enzyme. The oil should amount to at least about 50% of the volume of the emulsion if the emulsion is to retain its predominantly oily nature.

Pectin was named above as a specific example of a typical organic jellifying colloid. Many other materials of this class exist. They may be defined generally as organic materials which can be colloidally dispersed in water to form a dispersion having gel or shear strength. This gel strength of the aqueous phase apparently stabilizes an emulsion of the aqueous phase with oil by preventing ready contact and coalescence of the dispersed droplets. Other organic jellifying colloids suitable for forming emulsion gels include starch; proteins, such as gelatin; hemicelluloses, such as locust bean gum; natural gums, such as karaya or tragacanth; polyvinyl alcohols and water-soluble cellulose derivatives such as carboxymethylcellulose and ethylcellulose. Other examples will be apparent to those skilled in the art. Mixtures of various organic jellifying colloids may be employed so long as enzymes are included to attack all the colloids.

The preferred class of organic jellifying colloids consists of the water dispersible carbohydrate colloids including starch, pectin, hemicelluloses, natural gums (principally because of their starch content) and the so-called water-soluble celluloses such as carboxymethylcellulose. These colloids are also members of the class of materials sometimes termed amylaceous or starchy colloids. They are preferred because of their similarity of action, the stability of emulsions which can be formed with them, and because they are attacked in general by the amylases. Thus, mixtures of carbohydrate colloids will frequently be decomposed by a single enzyme.

The preferred material for forming emulsion gels has been found to be pectin, for example, technical grade apple pectin, which can be obtained readily as an article of commerce. Specific and highly effective enzymes are available for the decomposition of pectin. Also, loss of the pectin emulsions to porous formations can be very effectively inhibited by use of finely divided solids. Ground oyster shell flour has been found to be particularly effective as an additive to pectin emulsions in this regard. The preference for pectin depends partially on this combination action of pectin and oyster shell flour.

The amount of jellifying colloid employed depends not only on the type used but also on the purpose which the emulsion gel is to serve. If the gel is to be used to blanket a formation penetrated by a well while another formation is being treated, a semi-solid unpumpable emulsion will be desirable. If the purpose is to fracture a formation by hydraulic pressure, however, it is desirable to use a material with much lower viscosity and gel strength since it must be pumped into the well and must be capable of penetrating readily narrow fractures so as to extend them. In general, at least about 0.1 pound of the colloid should be used per gallon of the aqueous phase. This amount for most of the colloids will cause some increase in the viscosity of the water and will impart at least some gel strength. Even for blanketing applications with the least effective of the colloids the concentration should rarely exceed about 1 pound per gallon of the aqueous phase. Concentrations within the range of 0.2 to 0.5 pound per gallon are generally preferred. After selecting a suitable colloid, a few simple tests of viscosities and fluid losses of emulsions having various concentrations of colloid and various ratios of oil to water will quickly indicate the optimum composition for any specific purpose.

The selection of a suitable enzyme for a particular colloid generally simply requires reference to a standard work on enzymes. One example of such a reference is chapter 12 of "Practical Physiological Chemistry," by Hawk, Oser, and Summerson, 12th edition, the Blakiston Company, 1947. Another example is "Chemistry and Technology of Enzymes," by Tauber, John Wiley and Sons, 1949. If a protein or polypeptide such as gelatin is to be employed, for example, the table on pages 266 and 267 of the Hawk et al. reference indicates the enzyme may be a proteinase such as pepsin, rennin, or papain. If one of the water-dispersible carbohydrate jellifying colloids is employed, a carbohydrase such as amylase should be used. If a particular carbohydrate such as pectin is used for which a rather specific enzyme such as pectinase is readily available then it is generally advisable to employ this specific enzyme. The preferred enzyme for pectin is obtainable from Rohm and Haas Company under the trademark Pectinol 10-M. This material is preferred since it has been concentrated by removal of the sugar diluents present in other pectinases such as Pectinol A, another Rohm and Haas material. Mixtures of enzymes may often be used with advantage. In fact, many of the commercial enzymes such as Pectinol 10-M are actually mixtures of several specific enzymes.

The amount of enzyme employed in any particular case depends principally upon the amount of colloid which is present. The quantity of enzyme also depends to a certain extent upon the temperature to which the emulsion gel is to be subjected. In general, the higher the temperature the more rapid the reaction of the enzyme. This holds true up to a temperature of about 170° F. Temperatures above this point tend to cause decomposition of the enzymes thus preventing their action on the colloid. For highly effective enzymes such as Pectinol 10-M, as little as about 10 grams of enzyme per pound of colloid may be employed, particularly at elevated temperatures. At lower temperatures it may be advisable to employ as much as 40 or 50 grams of enzyme per pound of colloid. The amount of less effective enzymes should be increased in an amount inversely proportional to their effectiveness in breaking the emulsion gel by attacking the jellifying colloids. Thus, when reference is made to specific amounts of enzymes it will be understood that the figures apply to pure enzymes free from diluents.

The emulsion gels may be employed without the presence of solids other than the organic jellifying colloids. It is generally preferred, however, to incorporate a small amount of a finely divided solid such as oyster shell flour in the emulsion. When the term "finely divided solids" is employed hereinafter it is intended to mean an inorganic solid material which will pass through a 325 mesh screen. The preferred finely divided solid is the ground oyster shell flour previously mentioned. Other suitable materials include the clays such as bentonites, as well as minerals such as barytes, or iron oxide.

Oyster shell flour is particularly preferred if the colloid is pectin. It is known that pectin tends to react with calcium ions. This reaction aids the jellifying ability of the pectin. The ground shell flour probably acts with pectin not only in its ordinary way to build up a filter cake on permeable formations but also increases the gel strength of the aqueous phase by reaction of calcium ions with the pectin. As little as 0.1 percent of oyster shell flour, based on the weight of the entire emulsion, has been found to produce a distinct decrease in the loss of the emulsion to permeable formations. As much as 1 percent has been employed without difficulty. Up to 3 or 4 percent may be employed under some circumstances, but generally such higher concentrations are not advisable since little additional benefits are derived by the amount in excess of 1 percent.

An example of an emulsion gel fulfilling the requirements of my invention is given below:

First, a water dispersion was prepared in accordance with Table I.

*Table I*

| | | |
|---|---|---|
| Water | gallons | 6.0 |
| Pectin | pound | .7 |
| Oyster shell flour | do | 1.0 |
| Pectinol 10-M | grams | 20.0 |

This aqueous phase was then stirred into 35 gallons of crude oil from the Leonard Field in Oklahoma. The resulting emulsion had a fluid loss of 15 ml. in 30 minutes both at 80° F. and 140° F. These fluid losses were determined by means of the process and apparatus described in API code #29, second edition, July 1942 (tentative). The composition had a gel strength comparable to a thick mayonnaise. Several samples of the emulsion were held at various temperatures until the emulsion broke due to the action of the enzyme on the colloid. At 120° F. the emulsion broke in 6 hours. At 140° F. it broke in 4 hours. At 160° F. it broke in 3 hours.

In order to determine the effects of shell flour content the constituents of the aqueous phase were held constant as described in Table I while the shell flour content was varied. The oil was the same Leonard Field crude oil and the water-to-oil ratio was also held constant. The results in variations of shell flour content are presented in Table II.

*Table II*

| Shell Flour, lbs./bbl. | API Fluid Loss at Indicated Temperatures | |
|---|---|---|
| | 80° F. | 140° F. |
| 0.0 | 300 ml./2 min. | |
| .5 | 30 ml./30 min. | |
| 1.0 | 15 ml./30 min. | 15 ml./30 min. |
| 10.0 | 10 ml./30 min. | |
| 25.0 | 7 ml./30 min. | |

In order to determine the effects of variations in enzyme content, all other factors were maintained constant while the enzyme concentration was varied. The results of such a variation are presented in Table III.

*Table III*

| Enzyme, gm./bbl. | Breakdown Time at Indicated Temperature, Hours | | |
|---|---|---|---|
| | 120° F. | 140° F. | 160° F. |
| 15 | 10 | 6 | 5 |
| 20 | 6 | 4 | 3 |
| 30 | 5 | 3 | 2 |

From consideration of the above description and data it will be apparent that I have prepared a predominantly oily emulsion gel which has a low fluid loss and which will break down after a short time, under typical conditions to produce separate water and oil phases having low viscosities.

I claim:

1. A temporarily stable emulsion gel of a predominantly oily nature containing between about 50 and about 90 percent by volume of oil, and between about 10 and about 50 percent by volume of an aqueous phase containing an organic jellifying colloid in an amount between about 0.1 and about 1 pound per gallon of said aqueous phase, and said aqueous phase also containing an enzyme, capable of decomposing said jellifying colloid, in an amount between about 10 grams and about 50 grams per pound of jellifying colloid.

2. The composition of claim 1 in which said jellifying colloid is a carbohydrate and said enzyme is a carbohydrase.

3. The composition of claim 1 in which said jellifying colloid is pectin and said enzyme is pectinase.

4. The composition of claim 1 which includes, in addition to other constituents of the emulsion gel between about 0.1 and about 4 percent of a finely divided inorganic solid.

5. The composition of claim 4 in which said colloid is a carbohydrate and said enzyme is a carbohydrase.

6. The composition of claim 4 in which said colloid is pectin, said enzyme is pectinase.

7. The composition of claim 4 in which said colloid is pectin, said enzyme is pectinase, and said finely divided solid is oyster shell flour.

8. The method of increasing the productivity of a formation penetrated by a well comprising introducing into said well a temporarily stable emulsion gel of a predominantly oil nature containing between about 50 and about 90 percent by volume of oil, and between about 10 and about 50 percent by volume of an aqueous phase containing an organic jellifying colloid in an amount between about 0.1 and about 1 pound per gallon of said aqueous phase, and said aqueous phase also containing an enzyme, capable of decomposing said jellifying colloid, in an amount between about 10 grams and about 50 grams per pound of jellifying colloid, applying to said gel a pressure sufficient to fracture said formation, and producing said well.

9. The method of claim 8 in which said jellifying colloid is a carbohydrate and said enzyme is a carbohydrase.

10. The method of claim 8 in which said jellifying colloid is pectin and said enzyme is pectinase.

11. The method of claim 8 in which said emulsion gel includes, in addition to other constituents, between about 0.1 and about 4 percent of a finely divided inorganic solid.

12. The method of claim 11 in which said colloid is a carbohydrate and said enzyme is a carbohydrase.

13. The method of claim 11 in which said colloid is pectin and said enzyme is pectinase.

14. The method of claim 11 in which said colloid is pectin, said enzyme is pectinase, and said finely divided solid is oyster shell flour.

References Cited in the file of this patent

UNITED STATES PATENTS

| | | |
|---|---|---|
| 1,998,756 | Grebe et al. | Apr. 23, 1935 |
| 2,259,419 | Hefley et al. | Oct. 14, 1941 |
| 2,343,136 | Dobson et al. | Feb. 29, 1944 |
| 2,547,778 | Reistle | Apr. 3, 1951 |
| 2,651,500 | Teichmann | Sept. 8, 1953 |
| 2,672,935 | Braunlich et al. | Mar. 23, 1954 |
| 2,681,704 | Menaul | June 22, 1954 |